July 16, 1946.  O. H. SCHADE  2,404,099
AMPLIFYING SYSTEM
Filed Aug. 16, 1941  2 Sheets-Sheet 1

INVENTOR
Otto H. Schade
BY
Charles McClair
ATTORNEY

July 16, 1946.   O. H. SCHADE   2,404,099
AMPLIFYING SYSTEM
Filed Aug. 16, 1941   2 Sheets-Sheet 2

INVENTOR
Otto H. Schade
BY
Charles McClair
ATTORNEY

Patented July 16, 1946

2,404,099

UNITED STATES PATENT OFFICE 2,404,099

AMPLIFYING SYSTEM

Otto H. Schade, West Caldwell, N. J., assignor to Radio Corporation of America, a corporation of Delaware Application August 16, 1941, Serial No. 407,130

7 Claims. (Cl. 315—28)

My invention relates to high efficiency amplifying circuits for uni-directional signals and particularly to amplifiers for amplifying recurrent phenomena for portrayal in cathode ray oscilloscope equipment.

In many applications for the amplification of recurrent phenomena, it is desirable to provide a linear amplified output characteristic with minimum of equipment and power dissipation. In portable aircraft position indicators it is necessary to provide circuits having a high degree of frequency response as well as high precision so that the absolute distance between approaching aircraft or from an aircraft to ground station may be portrayed on a luminescent screen of a cathode ray tube with accurate precision. It is also desirable, especially when such equipment is to be located on the aircraft, to provide a minimum of weight and power dissipation. While certain of the objects of my invention may be obtained by other methods and means, such is true only by the use of larger and higher power dissipating equipment. Thus in circuits for obtaining high output voltages of square wave form severe limitations are incurred by the fact that the amplifier tube dissipation becomes excessive. It was therefore found necessary in the past to use relatively large tubes when the required output voltage exceeds a certain value by providing tubes of increased size and larger power dissipating capability. Such use also increases the amplifier circuit capacitance which in turn necessitates increased power dissipation.

It is therefore an object of my invention to increase the obtainable linear voltage output over a relatively high frequency band with low power dissipation. It is another object of my invention to provide a system wherein high linear output voltage wave forms may be obtained and wherein a minimum of power dissipation is required. It is a still further object to provide a system wherein uni-directional signals may be amplified efficiently by the use of conventional low power dissipation tubes, and it is a still further object to provide a system of high frequency band width wherein the power dissipation may be maintained at low values while retaining the advantages of low output loads which are required for high frequency response.

In accordance with my invention I provide an amplifying system utilizing at least two thermionic amplifying tubes and control the operation of the tubes so that the parameters determining the power dissipation are divided unequally between the tubes in combination with additional power limiting devices to limit the power output from at least one of the said tubes to a predetermined maximum value. These and other objects, features and advantages of my invention will become apparent when taken in connection with the following description and with the accompanying drawings wherein.

It will be appreciated that in circuits for obtaining high output voltages of square and asymmetric wave forms, it is necessary to provide very high frequency band widths up to and including a band width such as 10 megacycles per second. While large amplifying output tubes may be utilized with relatively low load resistors to obtain such wide band widths, such tubes and circuits are usually characterized by high power dissipation and relatively high tube and circuit capacitance. The plate dissipation in such tubes is proportional to the second power of the capacitance so that for a given frequency band, tubes having very large continuous power dissipation are necessary even though the useful integrated power output is relatively small. In so-called "class B" operation the continuous power consumption may be reduced but only at the sacrifice of nonlinearity. Therefore, in accordance with my invention I provide a counterphase amplifying circuit having at least two amplifying tubes, each having at least a cathode, control grid, and anode or plate electrode, and I adjust the grid and anode potentials so that a greater negative grid bias may be applied to the tube with the higher anode potential, and a lower negative grid bias may be applied to the tube having the lower anode potential. In operation the first tube operates near cut-off current at zero signal and hence operates with low or zero plate dissipation. The second tube operates with a low negative grid bias and a moderately high plate current at low plate voltage and hence also operates with moderate plate dissipation. Further in accordance with my invention I utilize voltage measuring control tubes which automatically vary the grid bias on each of the counterphase amplifier tubes to limit the maximum plate dissipation of one tube and maintain a linear summation characteristic. Obviously, my system is applicable only to the amplification of uni-directional wave forms such as square waves, either of the symmetrical or asymmetrical type, with low average components such as impulses of short duration with respect to their repetition time.

Figure 1:
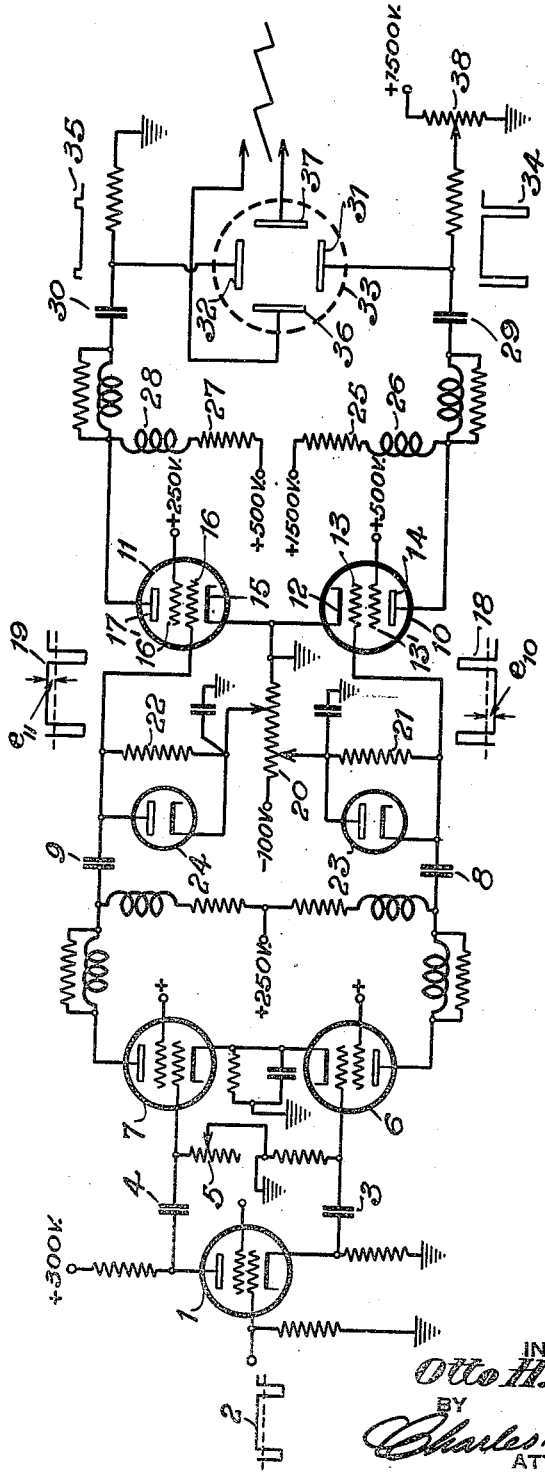
Figure 1 is a schematic circuit showing the principal features of my new and improved amplifying system for use in cathode ray deflection oscillographs.

The principles embodied in my system will be understood to better advantage by referring to Figure 1 which shows in schematic form one modification of an amplifying circuit employing my invention and particularly adapted for the amplification of square wave forms which may be applied to cathode ray indicating equipment. Referring to Figure 1, the tube 1, which may be of the single or multiple grid thermionic type, serves as a phase inverter for a square wave form shown at 2 for which amplification is desired. The wave form is applied across the grid-cathode input circuit and appears in unmodified form except for phase inversion across the plate cathode circuit. Thus a wave form similar to that shown at 2 is developed across the capacitor 3 and a similar wave form except for phase inversion across the capacitor 4. The relative amplitude of these wave forms may be varied by a variable resistor 5 connected as shown. In order to preserve the high frequency components comprising the square wave form shown at 2, the resistors in the input and output circuits of the tube 1 are of relatively low value. The output from the capacitor 3 may be further amplified by use of a conventional amplifying tube 6, and similarly the output from the capacitor 4 may likewise be amplified in conventional manner by an amplifier tube 7. Each of these tubes may likewise be of the single or multiple grid types. The outputs from each of the tubes 6 and 7 are applied through conventional coupling networks to output capacitors 8 and 9. Likewise, following current high frequency circuit principles in the design of the load circuit, tubes 6 and 7 are preferably of the low power consumption beam type, such as the tube known commercially as Type 6L6 operating at a plate potential supply of approximately 250 volts as shown. In accordance with my invention the signals to be further amplified and appearing at the capacitors 8 and 9 which are preferably of 0.1 microfarad value are applied to the input circuit of two tubes 10 and 11 operating in counterphase arrangement. In accordance with my principles of operation I apply a relatively high negative bias to tube 10 and a relatively low negative bias to the tube 11, and likewise apply a relatively high plate potential to the tube 10 and relatively low plate potential to the tube 11.

More particularly, the tube 10 includes a cathode 12, a control grid 13 and an anode 14, while the tube 11 includes a cathode 15, grid 16 and an anode 17; each of these tubes likewise may be of multi-grid as shown, including a screen grid 13' and 16', in which case suitable operating potentials may be applied to the additional grid electrode or electrodes. The signal appearing between the capacitor 8 and ground is applied directly to the grid 13 of the tube 10, the wave form being such as shown at 18, and similarly the wave form appearing between the capacitor 9 and ground is applied directly to the grid 16 of the tube 11. The average potentials or bias potentials of these grid electrodes, however, are maintained at definite values, one of which is higher than the other. I therefore provide means to maintain the two tubes at different bias values comprising a manually adjustable potential divider 20 connected between ground and cathode 12 and 15 and a source of negative potential. The grid 13 of the tube 10 is connected through a grid resistor 21 of approximately 250 K. ohms to a point on the potential divider 20 which is highly negative with respect to the cathode 12, whereas the grid 16 of the tube 11 is connected through a similar resistor 22 to a point on the potential divider 20 which is at a less negative potential. In this manner the grid bias on the tube 10 is maintained at a greater negative value than that of the grid of the tube 11. Further in accordance with my invention each of the grid resistors 21 and 22 are shunted by a peak voltage rectifying device, such as the diodes 23 and 24. These diodes rectify the peak voltage shown as $e_{10}$ and $e_{11}$ on the wave forms 18 and 19 and modify the grid biases by an equivalent D. C. voltage appearing across the resistors 21—22. To obtain this mode of operation I connect the diode 23 with its cathode to the grid 13 and the plate to the potential divider 20, and conversely the diode 24 is connected with its plate to the grid 16 and the cathode to the potential divider 20. In operation any signal 18 applied to the input circuit of the tube 10 will cause a decrease of the negative bias applied to this tube, and conversely any signal 19 will cause an increase in the negative bias applied to the tube 11. Further details of the operation of the voltage measuring devices 22 and 23 will be more fully described below. The anodes of the tubes 10 and 11 are likewise, in accordance with my invention, supplied with definite potentials, that of the tube 10 being considerably higher than that applied to the tube 11. The tubes 10 and 11 may be of the 6L6 type with an isolated anode lead, such as the commercially available tube Type 807, in which case a potential of 1500 volts may be applied to the plate 14 through a load resistor 25 of relatively low value to maintain proper frequency response in series with a load impedance 26; similarly, a potential of 500 volts may be applied to the anode 17 through a similar load resistor 27 and load impedance 28. The amplified outputs of the tubes 10 and 11 are preferably capacitively coupled through capacitors 29 and 30 through suitable nonattenuating circuits and to one set of deflection plates 31—32 of a conventional high voltage cathode ray tube 33. These amplified square wave potentials contain substantially all of the high frequency harmonics originally contained in the signal shown at 2 and appear across the respective plates 31—32 as shown at 34—35. A conventional sawtooth voltage wave form may be applied to the quadrature deflection plates 36—37 as well known in the art for the portrayal of the combined wave forms 34—35 on the conventional luminescent screen of the tube 33, and the portrayal of the square wave form may be centered on the luminescent screen by applying a positive potential to the plate 31 from the potentiometer 38.

Figure 2:
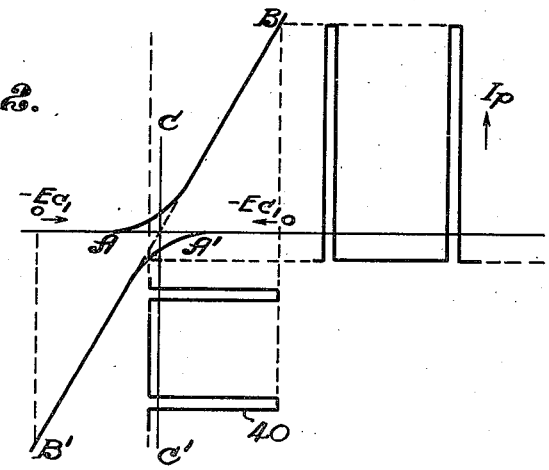
Figure 2 is a dynamic characteristic curve showing operation wave forms of a conventional amplifying system.
Figure 3:
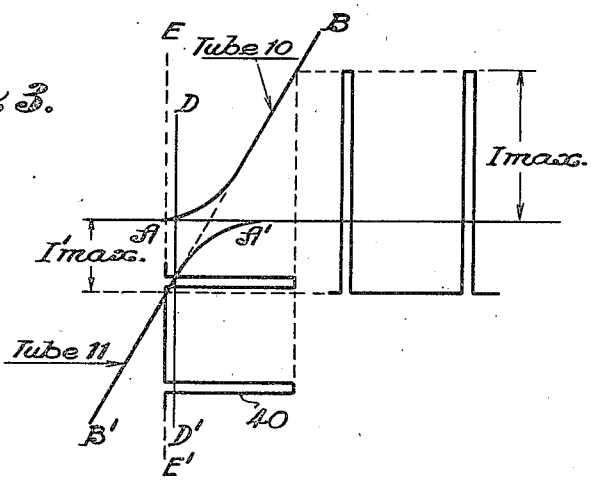
Figure 3 is a similar dynamic characteristic showing my improved method of operation.

The principles underlying the operation of my system will be more fully appreciated with reference to Figures 2 and 3 wherein Figure 2 is representative of a balanced bias and anode potential condition between the tubes 10 and 11, and Figure 3 is representative of an unbalanced condition of bias and anode potentials whereby the objects of my invention are obtained. Referring to Figure 2, the dynamic load characteristic of the tube 10 is represented by the line AB and that of the tube 11 by the line A'B'. Since the characteristics of the two tubes 10 and 11 are similar, the summation characteristic is substantially linear and represented by the line BB', a portion of which is shown in dashed line detail. The grids of the tubes 10 and 11 for the assumed balanced condition have applied thereto a signal, such as shown at 40 in Figure 2, the line CC' being representative of the average grid signal. It is here also assumed that the diodes and their circuits are not used in the balanced condition. For this balanced condition the grid bias on each of the tubes 10 and 11 would be of the same amount and the average grid signal represented by the line CC' remains stationary, always passing through the point O. Consequently, even in the absence of signals applied to the tubes 10 and 11, the plate dissipation of both tubes will be high because both of the tubes operate with a plate current represented by the intersection of line CC' with the characteristic AB and A'B' at a high anode potential applied to both tubes.

Figure 3, which shows the dynamic characteristic under unbalanced conditions, portrays the operation of the system when operated in accordance with my invention. The line EE' may be made to coincide always with one of the peak values of the grid signals by means of the diodes 23—24. The average value of the grid signals DD' is effectively shifted to the right by the rectified peak voltages $e_{10}$, $e_{11}$ adding to the fixed grid bias of the two tubes 10 and 11. By increasing the bias on one tube by an amount $e_{11}$ and at the same time decreasing the bias on the other tube by the amount $e_{10}$, the linearity of summation characteristic is not altered but the grid voltage axis is shifted to DD' as shown in Figure 3. Thus with the tubes 23 and 24 in operation the average moves according to the signal leaving EE' in a predetermined position. A fixed maximum current cannot, therefore, be exceeded in tube 11 regardless of signal. It is therefore obvious from Figure 3 that a square wave form, such as the signal shown at 40, will cause a high current and low plate voltage on tube 11, and a low or zero current with corresponding high plate voltage on tube 10 for the long interval between the signal pulses. Both of these conditions represent low plate dissipation in the respective tubes. Therefore, for zero signal conditions the tube 10 has the same low dissipation as between signal impulses.

The tube 11, when operated with low negative bias and relatively low anode potential, operates with a moderate anode current at zero signal, and since the signal is uni-directional toward its cut-off voltage and beyond, the required anode supply voltage for the tube 11 is considerably less than that required for the tube 10. The necessary anode supply voltage on each tube is given by the expression:

$$E_b = E_p\text{min} + (I\text{max} \cdot R_L)$$

Figure 4:
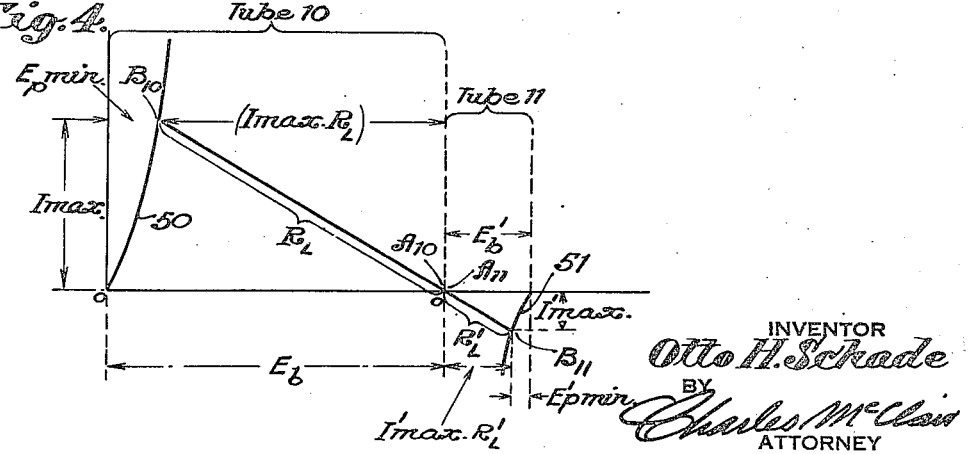
Figure 4 is a graphical diagram of certain static anode characteristics of my amplifying system.

These voltages and currents may be shown graphically on the static anode potential-anode current characteristics as in Figure 4. This static characteristic may be used to determine the operating parameters for the tubes 10 and 11. The load resistors 25 and 27 are chosen in accordance with the tube characteristics to give the desired band width, these resistors being identical for similar tubes. The output signal of tube 10 may be assumed as $\frac{4}{5}$ of the total desired output signal swing and hence furnishes the maximum current ($I\text{max}$) to be supplied by tube 10. The load line $A_{10}B_{10}$ is drawn with a slope corresponding to the resistance of resistor 25 through the assumed $I\text{max}$ value which is located on the knee line 50 of the tube 10. This knee line is the envelope curve of all plate voltage-plate current characteristics with control grid or screen grid voltage or voltages as parameters. This will determine the necessary anode potential $E_b$ for the tube 10. To determine the corresponding anode potential for tube 11 the load line is extended so as to be ¼ as long as $A_{10}B_{10}$ which determines the point $B_{11}$ through which the perveance characteristic 51 of the tube 11 is drawn. The values $E_b'$, $I'\text{max}$ and $E_p'\text{min}$ are thus derived.

The dynamic characteristics for the tubes 10 and 11 shown in Figure 3 are then drawn using these assumed and derived parameters, adjusting their position to give the linear summation characteristic. If the tubes 10 and 11 are of the multi-grid type as shown, the screen potential required for tube 11 will be found to have a lower value than tube 10 because of the lower current requirements. The line EE' of Figure 3 is now drawn through the current value of $I'\text{max}$ intersecting the characteristic AB of tube 10 at the zero signal current value. The zero signal power dissipation is given for tube 10 by this zero signal current $I_0$ multiplied by the anode voltage of the tube 10:

$$P = I_0(E_b - I_0R_L)$$

The power dissipation for tube 11 is similarly obtained from Figure 4 and is:

$$P' = I'\text{max}(E_b' - I'\text{max}R_L')$$

If these dissipations do not exceed the tube rating, the derived values represent one possible operating condition. If the dissipation of tube 10 exceeds the tube rating, the line EE' must be moved toward cut-off until a dissipation conforming to the rating is not exceeded. The required current $I'\text{max}$ for tube 11 is thus increased as seen from Figure 3 and can be determined from Figure 3 as the intersection of line EE' with a linear summation characteristic. Consequently, the intersection of the load line $A_{11}B_{11}$ in Figure 4 with the perveance characteristic 51 must be corrected solving for the required higher plate potential $E_b'$ of tube 11. The zero power dissipation of tube 11 is redetermined with these new values. If the resultant dissipation of tube 11 exceeds the rating, it is not possible to obtain the assumed signal output for the tubes chosen and the process must be repeated for a signal output lower than the desired output referred to above. In this manner the maximum signal output may be determined for the chosen type of tubes 10 and 11.

While I have disclosed my invention with particular reference to the amplification of square wave forms, it will be obvious that it is also of particular advantage in the amplification of any pulse-type wave forms wherein the average value between reoccurrence of the pulses is relatively long with respect to the pulse time. It will likewise be obvious that my system possesses considerable merit in the amplification of wave forms of the pulse type having a smaller and larger amplitude of opposite polarities. Therefore, while I have described my invention with reference to the amplification of signals of particular wave form and have likewise disclosed only one particular modification of which my invention is susceptible, it will be obvious that my invention is suitable for use in amplifying other wave forms and that other modifications thereof will immediately occur to those skilled in the art, and I am therefore not to be limited to the particular use or modification set forth above except as set forth in the following claims.

I claim:

1. A counterphase amplifying system for amplifying signals of square wave form comprising a pair of thermionic amplifying tubes of the multigrid type, each having a cathode, grid and anode, means to apply different negative biasing potentials with respect to the cathode between the cathode and grid of said two tubes, means to apply different positive potentials between the anode and cathode of each of said tubes, the positive potential applied to the tube having the most negative biasing potential being higher than that applied to the other tube, means to apply the square wave form between the cathode and grid of one tube and means to simultaneously apply a similar wave form to be amplified, but of opposite polarity thereto, to the other of said tubes, whereby the ouput wave form from each of said tubes is an amplified signal component of the said square wave form.

2. A system for amplifying a square wave voltage impulse comprising a pair of amplifier tubes having input and output electrodes, means to apply the square wave form to be amplified to the input electrode of one of said tubes, means to apply an inverted wave form of the wave form to be amplified to the other of said tubes, means to maintain the input electrodes of said tubes at a predetermined average potential, means to apply a bias potential more negative than the said predetermined potential on the input electrode of said one tube to the input electrode of the other tube, and means to apply a positive potential to each of the output electrodes of said tubes, the potential applied to said one tube being lower than that applied to the said other tube.

3. A system for amplifying a square wave form for portrayal on a cathode ray tube comprising a pair of similar amplifying tubes, each having a cathode, grid and anode, means to apply different grid bias and anode potentials to each of said tubes, means to adjust the bias on each of said tubes such that the tube having the higher anode potential has applied thereto the more negative bias potential to displace the operating point on the dynamic summation characteristics of said tubes in opposite directions, means to apply the square wave form to be amplified between the cathode and grid of each tube in inverted form, one with respect to the other, a cathode ray tube having a pair of oppositely disposed deflection plates and means capacitively connecting each of said deflection plates to one of said anodes whereby the combined wave form appearing between said anodes is applied to said deflection plates for portrayal of said combined wave form.

4. A counterphase amplifying system for amplifying pulse wave forms for portrayal on a cathode ray tube comprising a pair of amplifying tubes, each having a cathode, grid and anode, means to maintain the anodes of each of said tubes at different positive potentials with respect to the respective cathodes, means to displace the operating point on the dynamic summation characteristic towards cut-off on the tube with the higher anode potential and towards higher anode current on the tube with the lower anode potential, means to apply the pulse wave form to be amplified between the cathode and grid of each tube in inverted form, one with respect to the other, a cathode ray tube having a pair of oppositely disposed deflection plates and means connecting each of said deflection plates to one of said anodes whereby the combined wave form appearing between said anodes is applied to said deflection plates for portrayal of said combined wave form.

5. A system for portraying a square wave form on a cathode ray tube comprising a counterphase amplifying circuit including a pair of amplifying tubes having a cathode, input grid, screen grid and anode, a source of bias potential of different magnitude connected between the cathode and input grid of each of said tubes, a positive potential source of different magnitude connected to each of said screen grids, a positive potential source of different magnitude connected to each of said anodes through a load resistor to form an output circuit for each of said tubes, the screen grid and anode sources of the tube having the lower negative bias being of lower magnitude than those connected to the screen grid and anode of the tube having the greater negative bias, means to apply to each of said input grids mutually inverted components of a square wave form, each of said components having two different amplitudes, to develop signals having different amplitudes in the output circuits of said tubes, means to modify the bias of each of said tubes in proportion to the smaller amplitude of the signals applied to each of said tubes, a cathode ray tube having a pair of oppositely disposed deflection plates and means connecting said anodes respectively to said plates whereby the amplified inverted components of said square wave form are applied between said deflection plates for portrayal of said wave form.

6. A counterphase amplifying system for portraying a square wave form on a cathode ray tube comprising an amplifying circuit including a pair of similar amplifying tubes, each having a cathode, input grid, screen grid and anode, a direct electrical connection between the cathodes of each of said tubes, a source of bias potential of different magnitude connected between the cathode and input grid of each of said tubes, a positive potential source of different magnitude connected to each of said screen grids, a positive potential source of different magnitude connected to each of said anodes through a load impedance to form an output circuit, the screen grid and anode sources of the tube having the lower negative bias being of lower magnitude than those connected to the screen grid and anode of the tube having the greater negative bias, means to apply to each of said input grids a mutually inverted component of a square wave having a smaller and larger amplitude of opposite polarities, a diode having a cathode and grid connected between each of said input grids and the cathode of said tubes in series with the said sources of bias potential of different magnitude to modify the bias of each of said tubes in accordance with the smaller amplitude of the square wave form applied to each of said tubes, a cathode ray tube having a pair of oppositely disposed deflection plates and means connecting said anodes respectively to said plates whereby the amplified inverted components of said square wave form are applied between said deflection plates for portrayal of said wave form.

7. A system for portraying a square wave form on a cathode ray tube comprising a counterphase amplifying circuit including a pair of amplifying tubes, each having a cathode, input grid, screen grid and anode, a source of bias potential of different magnitude connected between the cathode and input grid of each of said tubes, a positive potential source of different magnitude connected to each of said screen grids, a positive potential source of different magnitude connected to each of said anodes. the screen grid and anode sources of the tube having the lower negative bias being of lower magnitude than those connected to the screen grid and anode of the tube having the greater negative bias, means to apply to the input grid of the tube having the lower anode and screen grid potentials an input square wave form to be portrayed with such polarity that the higher amplitude of said square wave decreases the current of said tube, means to apply to the other of said tubes a counterphase component of said input wave form, means to modify the bias of each of said tubes in accordance with the smaller amplitude of the square wave forms applied to said tubes comprising a diode connected with its anode to the source of higher grid bias and its cathode to the input grid of the tube with higher anode potential and a second diode inversely connected with respect to the lower bias source and the input grid of the tube with lower anode potential, a cathode ray tube having a pair of oppositely disposed deflection plates and means connecting said anodes respectively to said plates whereby the amplified inverted components of said square wave form are applied between said deflection plates for portrayal of said wave form.

OTTO H. SCHADE.